US009255188B2

(12) United States Patent
Kilambi et al.

(10) Patent No.: US 9,255,188 B2
(45) Date of Patent: *Feb. 9, 2016

(54) COMPOSITIONS COMPRISING LIGNIN

(71) Applicant: Renmatix, Inc., King of Prussia, PA (US)

(72) Inventors: Srinivas Kilambi, Duluth, GA (US); Kiran L. Kadam, Golden, CO (US)

(73) Assignee: Renmatix, Inc., King of Prussia, PA (US)

(*) Notice: Subject to any disclaimer, the term of this patent is extended or adjusted under 35 U.S.C. 154(b) by 20 days.

This patent is subject to a terminal disclaimer.

(21) Appl. No.: 14/048,935

(22) Filed: Oct. 8, 2013

(65) Prior Publication Data

US 2014/0039144 A1   Feb. 6, 2014

Related U.S. Application Data

(63) Continuation of application No. 13/472,798, filed on May 16, 2012, now Pat. No. 8,759,498.

(60) Provisional application No. 61/581,865, filed on Dec. 30, 2011.

(51) Int. Cl.
*C08G 8/20* (2006.01)
*C08G 16/02* (2006.01)
*C08H 7/00* (2011.01)
*C07G 1/00* (2011.01)

(52) U.S. Cl.
CPC .. *C08H 6/00* (2013.01); *C07G 1/00* (2013.01); *C08G 8/20* (2013.01); *C08G 16/0293* (2013.01)

(58) Field of Classification Search
CPC .. C08G 8/04; C08G 16/0293; C08G 18/6492; C08L 97/005
See application file for complete search history.

(56) References Cited

U.S. PATENT DOCUMENTS

| 1,959,433 | A | 5/1934 | Loetscher |
| 2,727,869 | A | 12/1955 | Ash et al. |
| 2,781,328 | A | 2/1957 | Ayers et al. |
| 3,282,869 | A | 11/1966 | Bryner |
| 4,357,194 | A | 11/1982 | Stofko |
| 4,644,060 | A | 2/1987 | Chou |
| 4,764,596 | A | 8/1988 | Lora et al. |
| 4,857,638 | A | 8/1989 | Yalpani et al. |
| 4,946,946 | A | 8/1990 | Fields et al. |
| 4,964,995 | A | 10/1990 | Chum et al. |
| 5,041,192 | A | 8/1991 | Sunol et al. |
| 5,169,687 | A | 12/1992 | Sunol |
| 5,196,460 | A | 3/1993 | Lora et al. |
| 5,213,660 | A | 5/1993 | Hossain et al. |
| 5,338,366 | A | 8/1994 | Grace et al. |
| 5,424,417 | A | 6/1995 | Torget et al. |
| 5,503,996 | A | 4/1996 | Torget et al. |
| 5,705,369 | A | 1/1998 | Torget et al. |
| 5,811,527 | A | 9/1998 | Ishitoku et al. |
| 6,022,419 | A | 2/2000 | Torget et al. |
| 6,025,452 | A | 2/2000 | Kurple |
| 7,259,231 | B2 | 8/2007 | Cornish et al. |
| 7,955,508 | B2 | 6/2011 | Allan et al. |
| 2002/0061583 | A1 | 5/2002 | Kawamura et al. |
| 2003/0156970 | A1 | 8/2003 | Oberkofler et al. |
| 2003/0221361 | A1 | 12/2003 | Russell et al. |
| 2008/0015336 | A1 | 1/2008 | Cornish et al. |
| 2008/0051566 | A1 | 2/2008 | Ohman et al. |
| 2009/0069550 | A1* | 3/2009 | Belanger et al. ............... 530/507 |
| 2010/0043782 | A1 | 2/2010 | Kilambi |
| 2010/0063271 | A1 | 3/2010 | Allan et al. |
| 2010/0069626 | A1 | 3/2010 | Kilambi |
| 2010/0081798 | A1 | 4/2010 | Balensiefer et al. |
| 2010/0136642 | A1 | 6/2010 | Belanger et al. |
| 2010/0152509 | A1 | 6/2010 | Ekman |
| 2010/0159569 | A1 | 6/2010 | Medoff et al. |
| 2010/0170504 | A1 | 7/2010 | Zhang |
| 2010/0203605 | A1 | 8/2010 | Kim et al. |
| 2010/0305242 | A1 | 12/2010 | Balakshin et al. |
| 2010/0329938 | A1 | 12/2010 | Allan et al. |
| 2010/0330638 | A1 | 12/2010 | Aita et al. |
| 2011/0021743 | A1 | 1/2011 | Cornish et al. |
| 2011/0100359 | A1 | 5/2011 | North |
| 2011/0137085 | A1 | 6/2011 | Trahanovsky et al. |
| 2011/0151516 | A1 | 6/2011 | Van Der Heide et al. |
| 2011/0165643 | A1 | 7/2011 | Retsina et al. |
| 2011/0232160 | A1 | 9/2011 | Siskin et al. |
| 2011/0253326 | A1 | 10/2011 | Sherman et al. |
| 2011/0287502 | A1 | 11/2011 | Castor |
| 2011/0294991 | A1 | 12/2011 | Lake et al. |

(Continued)

FOREIGN PATENT DOCUMENTS

JP   04197192    7/1992
JP   2006255676  9/2006

(Continued)

OTHER PUBLICATIONS

"Lignin and its properties", Dialogue/Newsletters, vol. 9, No. 1, Lignin Institute, Jul. 2001.
"http://www.astm.org/Standards/ E1755.htm", retrieved from the internet at least as early as May 16, 2012.
"Lignin and its properties: Glossary of Lignin Nomenclature", Dialogue/Newsletters, vol. 9, No. 1, Lignin Institute, retrieved from the internet at least as early as May 16, 2012., Jul. 2001.
"The Alternative Energy Magazine", http://www.altenergymag.com/emagazine/2009/06/lignin-as-alternative-renewable-fuel/1384), retrieved from the internet at least as early as May 16, 2012.
U.S. Appl. No. 13/472,798, "Final Office Action", Dec. 3, 2012, 10 pages.
U.S. Appl. No. 13/472,798, "Non-Final Office Action", Apr. 17, 2013, 12 pages.
U.S. Appl. No. 13/472,798, "Non-Final Office Action", Aug. 7, 2012, 12 pages.
U.S. Appl. No. 13/472,798, "Final Office Action", Oct. 29, 2013, 27 pages.

(Continued)

*Primary Examiner* — Liam J Heincer
(74) *Attorney, Agent, or Firm* — Travis B. Gasa; Andrew G. Bunn; Ballard Spahr LLP

(57) ABSTRACT

Compositions comprising lignin and low levels of undesirable impurities, such as compounds containing sulfur, nitrogen, or metals, are disclosed.

30 Claims, No Drawings

(56) References Cited

U.S. PATENT DOCUMENTS

| | | | |
|---|---|---|---|
| 2012/0108798 A1 | 5/2012 | Wenger et al. |
| 2012/0116063 A1 | 5/2012 | Jansen et al. |
| 2012/0145094 A1 | 6/2012 | Simard |
| 2012/0184788 A1 | 7/2012 | Loop et al. |
| 2013/0172540 A1 | 7/2013 | Simard et al. |
| 2013/0239954 A1 | 9/2013 | Kilambi et al. |

FOREIGN PATENT DOCUMENTS

| | | |
|---|---|---|
| JP | 2010042604 | 2/2010 |
| WO | 9714747 | 4/1997 |
| WO | 0061276 | 10/2000 |
| WO | 0132715 | 5/2001 |
| WO | 2004013409 | 2/2004 |
| WO | 2009060126 | 5/2009 |
| WO | 2010034055 | 4/2010 |
| WO | 2010045576 | 4/2010 |
| WO | 2011091044 | 7/2011 |
| WO | 2011094859 | 8/2011 |
| WO | 2013101397 | 7/2013 |

OTHER PUBLICATIONS

Boerjan et al., "Lignin biosynthesis", Ann. Rev. Plant Bio., 54(1), Jun. 2003, 519-549.

Conner et al., "Carbohydrate Modified Phenol-Formaldehyde Resins", vol. 6(4), 1986, 591-613.

Ehara et al., "Characterization of the lignin-derived products from wood as treated in supercritical water", Journal of Wood Science, vol. 48, No. 4, Aug. 2002, pp. 320-325.

Ehrman , "Methods for the chemical analysis of biomass process streams", Handbook on Bioethanol, 1996, 395-415.

Jiang et al., "A method for quick analysis of biomass chemical composition from element analysis", Huagong Xuebao (Chinese Edition), 61(6), 2010, 1506-1509.

Nunn et al., "Product compositions and kinetics in the rapid pyrolysis of milled wood lignin", Industrial & Engineering Chemistry Process Design and Development, vol. 24, Jul. 1985, pp. 844-852.

International Patent Application No. PCT/US2012/067535, "International Search Report and Written Opinion Received", Feb. 20, 2013, 10 pages.

Ralph et al., "Elucidation of new structures in lignins of CAD- and COMT-deficient plants by NMR", Phytochem. 57(6), 2001, 993-1003.

Sluiter et al., "Determination of Ash in Biomass", Laboratory Analytical Procedure, National Renewable Energy Laboratory, downloaded from http://www.astm.org/Standards/ E1755.htm, Jul. 17, 2005.

Sukhanovskii et al., "The chemical composition of the organic part and of ash in hydrolysis lignins", Gidroliznaya i Lesokhimicheskaya Promyshlennost, 18(5), 1965, 15-17.

Svitel'Skii, "Study of ash in lignin from kraft mill effluents", Mater. Nauch.-Tekh. Konf. Leningrad. Lesotekh. Akad., No. 4, 1966, 180-185.

Zhang et al., "Lignocellulosic ethanol residue-based lignin-phenol-formaldehyde resin adhesive", International Journal of Adhesion & Adhesives, vol. 40, 2013, 11-18.

Zhang et al., "Preparation and properties of lignin-phenol-formaldeyde resins based on different biorefinery residues of agricultural biomass", Industrial Crops and Products, vol. 43, 2013, 326-333.

\* cited by examiner

COMPOSITIONS COMPRISING LIGNIN

CROSS REFERENCE TO RELATED APPLICATIONS

This application is a continuation of U.S. application Ser. No. 13/472,798, filed May 16, 2012, which claims the benefit of U.S. Application No. 61/581,865, filed Dec. 30, 2011, the entire disclosures of which are incorporated herein by reference.

FIELD OF THE INVENTION

The present invention generally relates to compositions comprising lignin containing maximum levels of undesirable impurities, such as compounds containing sulfur, nitrogen, or metals.

BACKGROUND OF THE INVENTION

There are a number of processes for converting lignocellulosic biomass into liquid streams of various sugars. Certain preferred processes are based on supercritical water (SCW) or hot compressed water (HCW) technology, which offer several advantages including high throughputs, use of mixed feedstocks, separation of sugars, and avoidance of concentrated acids, microbial cultures, and enzymes. Processes using hot compressed water may have two distinct operations: pre-treatment and cellulose hydrolysis. The pre-treatment process hydrolyzes the hemicellulose component of the lignocellulosic biomass and cellulose hydrolysis (CH) process hydrolyzes the cellulose fibers. The resultant five carbon (C5) and six carbon (C6) sugar streams are recovered separately. The remaining solids, which consist mostly of lignin, are preferably recovered, such as through filtration, and may be used as a fuel to provide thermal energy to the process itself or for other processes. Lignin has the combustion heat of 26.6 KJ/g, and holds highest energy among all natural polymeric compounds that contain carbon, hydrogen and oxygen. In energy, lignin is equivalent to ethanol, which also contains carbon, hydrogen and oxygen, and has the combustion heat of 30 KJ/g. However, for a given volume, lignin's combustion heat is approximately 1.5 times as much as that of ethanol, because of lignin's higher density. http://www.altenergymag-.com/emagazine/2009/06/lignin-as-alternative-renewable-fuel/1384). Thus, lignin serves as a useful renewable energy source.

Lignocellulosic biomass contains cellulose, hemicellulose, and lignin, along with minor amounts of proteins, lipids (fats, waxes, and oils) and minerals. About two thirds of the dry mass of cellulosic materials is present as cellulose and hemicellulose with lignin making up the bulk of the remaining dry mass. Lignin is a cross-linked racemic macromolecule with a molecular masse in excess of 10,000 Daltons. It is relatively hydrophobic and aromatic in nature. The degree of polymerization in nature is difficult to measure, since it is fragmented during extraction and the molecule consists of various types of substructures that appear to repeat in a haphazard manner. Different types of lignin have been described depending on the means of isolation. "Lignin and its Properties: Glossary of Lignin Nomenclature," *Dialogue/Newsletters* Volume 9, Number 1, Lignin Institute, July 2001.

There are three monolignol monomers, methoxylated to various degrees: p-coumaryl alcohol, coniferyl alcohol, and sinapyl alcohol. K. Freudenberg & A. C. Nash (eds) (1968). *Constitution and Biosynthesis of Lignin*. Berlin: Springer-Verlag. These lignols are incorporated into lignin in the form of the phenylpropanoids p-hydroxyphenyl (H), guaiacyl (G), and syringal (S), respectively. W. Boerjan, J. Ralph, M. Baucher (June 2003). "Lignin bios". *Ann. Rev. Plant Biol.* 54 (1): 519-549. Gymnosperms have a lignin that consists almost entirely of G with small quantities of H. That of dicotyledonous angiosperms is more often than not a mixture of G and S (with very little H), and monocotyledonous lignin is a mixture of all three. Id. Many grasses have mostly G, while some palms have mainly S. All lignins contain small amounts of incomplete or modified monolignols, and other monomers are prominent in non-woody plants. J. Ralph, et al. (2001). "Elucidation of new structures in lignins of CAD- and COMT-deficient plants by NMR." *Phytochem.* 57 (6): 993-1003.

Impurities may be introduced into lignin via processing of the lignocellulosic biomass. Since lignin compositions may be used as a fuel in the SCW or HCW process or other processes, they preferably have a low level of contaminants or impurities that contribute to health, environmental, and safety concerns. For example, it is highly desirable to have no or only a low level of compounds containing sulfur in the lignin composition, as the presence of sulfur may contribute to SOx emissions, when the lignin is combusted. In other applications, low levels of sulfur may also be desirable if lignin is chemically converted through a catalytic process to a downstream product or a derivative. Low levels of sulfur within the final product may also be desirable from product acceptance criteria, or low levels of sulfur may help prevent premature catalyst deactivation for such chemical conversions.

Accordingly, the invention is directed to lignin compositions having low levels of impurities, as well as other important ends.

SUMMARY OF THE INVENTION

In one embodiment, the invention is directed to compositions, comprising:
lignin; and
less than about 2000 mg in total per kg of said lignin of elements;
wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

In some embodiments, the compositions further comprise less than about 700 mg of calcium per kg of said lignin. In other embodiments, the compositions further comprise less than about 525 mg of iron per kg of said lignin. In yet other embodiments, the compositions further comprise less than about 150 mg of sulfur per kg of said lignin. In some embodiments, the compositions further comprise less than about 20 g of ash per kg of said lignin. In other embodiments, the compositions comprise less than about 2000 mg of nitrogen per kg of said lignin. In yet other embodiments, the compositions further comprise a weight ratio of the total mass of hydrogen and nitrogen to carbon of less than about 0.110.

In other embodiments, the invention is directed to compositions, comprising:
lignin;
less than about 700 mg of calcium per kg of said lignin;
less than about 525 mg of iron per kg of said lignin; and
less than about 150 mg of sulfur per kg of said lignin.
In some embodiments, the compositions comprise less than about 2000 mg in total per kg of said lignin of elements;
wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

In yet other embodiments, the invention is directed to compositions, comprising:
lignin; and
less than about 700 mg of calcium per kg of said lignin.

In some embodiments, the compositions comprise less than about 2000 mg in total per kg of said lignin of elements; wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

In yet further embodiments, the invention is directed to compositions, comprising:
lignin; and
less than about 525 mg of iron per kg of said lignin.

In some embodiments, the compositions comprise less than about 2000 mg in total per kg of said lignin of elements; wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

In yet another embodiment, the invention is directed to compositions, comprising:
lignin; and
less than about 150 mg of sulfur per kg of said lignin.

In some embodiments, the compositions comprise less than about 2000 mg in total per kg of said lignin of elements; wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

DETAILED DESCRIPTION OF THE INVENTION

As employed above and throughout the disclosure, the following terms, unless otherwise indicated, shall be understood to have the following meanings.

As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

As used herein, the phrase "substantially free" means have no more than about 1%, preferably less than about 0.5%, more preferably, less than about 0.1%, by weight of a component, based on the total weight of any composition containing the component.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C.) but less than subcritical and at pressures such that water is in a liquid state As used herein, a fluid which is "supercritical" (e.g. supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc.). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, "lignocellulosic biomass or a component part thereof" refers to plant biomass containing cellulose, hemicellulose, and lignin from a variety of sources, including, without limitation (1) agricultural residues (including corn stover and sugarcane bagasse), (2) dedicated energy crops, (3) wood residues (including hardwoods, softwoods, sawmill and paper mill discards), and (4) municipal waste, and their constituent parts including without limitation, lignocellulose biomass itself, lignin, $C_6$ saccharides (including cellulose, cellobiose, $C_6$ oligosaccharides, $C_6$ monosaccharides, $C_6$ saccharides (including hemicellulose, $C_6$ oligosaccharides, and $C_6$ monosaccharides), and mixtures thereof.

As used herein, "ash" refers to the non-aqueous residue that remains after a sample is burned, and consists mostly of metal oxides. Ash content may be measured in accordance with ASTM Standard Method No. E1755-01 "Standard Method for the Determination of Ash in Biomass." This test method covers the determination of ash, expressed as the percentage of residue remaining after dry oxidation at 550 to 600° C. All results are reported relative to the 105° C. oven dry weight of the sample." See also: http://www.nrel.gov/biomass/pdfs/42622.pdf and http://www.astm.org/Standards/E1755.htm, which are both incorporated herein by reference in their entirety.

Accordingly, in one embodiment, the invention is directed to compositions, comprising:
lignin; and
less than about 2000 mg, preferably less than about 1775 mg, in total per kg of said lignin of elements;
wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

In other embodiments, the invention is directed to compositions, comprising: lignin;
less than about 700 mg, preferably less than about 675 mg, of calcium per kg of said lignin;
less than about 525 mg, preferably less than about 505 mg, of iron per kg of said lignin; and
less than about 150 mg, preferably less than about 147 mg, of sulfur per kg of said lignin.

In some embodiments, the compositions comprise:
lignin; and
less than about 700 mg, preferably less than about 675 mg, of calcium per kg of said lignin.

In some embodiments, the compositions comprise:
lignin; and
less than about 525 mg, preferably less than about 505 mg, of iron per kg of said lignin.

In some embodiments, the compositions comprise:
lignin; and
less than about 150 mg, preferably less than about 147 mg, of sulfur per kg of said lignin.

In some embodiments, the compositions comprise less than about 2000 mg, preferably less than 1775 mg, in total per kg of said lignin of elements; wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

In some embodiments, the compositions further comprise less than about 700 mg, preferably less than about 675 mg, of calcium per kg of said lignin. In other embodiments, the compositions further comprise less than about 525 mg of iron per kg of said lignin. In yet other embodiments, the compositions further comprise less than about 150 mg of sulfur per kg of said lignin.

In some embodiments, the lignin has a heating value as measured by ASTM-D240 and D5865 of at least about 5,000 BTU/lb, preferably at least about 7,500 BTU/lb, and more preferably, at least about 8,000 BTU/lb.

In some embodiments, the lignin has an average particle size less than about 500 microns. In preferred embodiments, the lignin has an average unaggregated particle size less than about 100 microns. In other preferred embodiments, the lignin has an average unaggregated particle size less than about 60 microns.

In some embodiments, the lignin has a bulk density of less than about 0.35 g/cc, depending upon particle size.

In some embodiments, the lignin is processed from lignocellulosic biomass optionally using supercritical, subcritical, or near critical fluid extraction or combinations thereof.

In some embodiments, the composition is substantially free of organic solvent.

In some embodiments, the lignin is in a powdered form. In other embodiments, the lignin is in a pelletized form. In yet other embodiments, the lignin is in a liquid form. In addition, the lignin may be in combination of these forms.

In some embodiments, is present at a level of at least 30% by weight, based on the total weight of the composition, as measured by pyrolysis molecular beam mass spectrometry.

In some embodiments, the weight ratio of syringyl monolignol to guaiacyl monolignol is about 2.0 to about 3.0, as measured by pyrolysis molecular beam mass spectrometry.

In some embodiments, the compositions further comprise less than about 700 mg, preferably less than about 675 mg, of calcium per kg of said lignin.

In some embodiments, the compositions further comprise less than about 525 mg, preferably less than about 505 mg, of iron per kg of said lignin.

In some embodiments, the compositions further comprise less than about 150 mg, preferably less than about 147 mg, of sulfur per kg of said lignin.

In some embodiments, the levels of said elements are measured by inductively coupled plasma emission spectroscopy.

In some embodiments, the compositions further comprise less than about 20 g of ash per kg of said lignin, preferably less than about 17.5 g of ash per kg of said lignin.

In other embodiments, the compositions comprise less than about 2000 mg of nitrogen per kg of said lignin, preferably less than about 1900 mg of nitrogen per kg of said lignin. Nitrogen may be measured by thermal conductivity detection after combustion and reduction.

In yet other embodiments, the compositions further comprise a weight ratio of the total mass of hydrogen and nitrogen to carbon of less than about 0.110, preferably less than about 0.105. Carbon, hydrogen, and nitrogen levels may be measured by thermal conductivity detection after combustion and reduction.

In certain other embodiments, the compositions comprising the lignin further comprise less than a maximum of any of the elements, individually or in combination, in the table listed below:

| Element | Level less than about (mg of element/kg of lignin) |
| --- | --- |
| Al | 50 |
| As | 16 |
| B | 3.25 |
| Ba | 3.7 |
| Be | 0.04 |
| Cd | 0.850 |
| Co | 1.25 |
| Cr | 2.0 |
| Cu | 20.0 |
| K | 45.0 |
| Li | 0.310 |
| Mg | 22.5 |
| Mn | 7.00 |
| Mo | 3.00 |
| Na | 61.5 |
| Ni | 1.50 |
| P | 115 |
| Pb | 10.00 |
| Sb | 9.50 |
| Se | 21.0 |
| Si | 65.0 |
| Sn | 11.00 |
| Sr | 2.25 |
| Ti | 6.00 |
| Tl | 21.0 |
| V | 0.350 |
| Zn | 11.5 |

In further embodiments, the compositions further comprise less than about 0.5% by weight, based on the total weight of said lignin, of organic solvent, such as alcohols, including water miscible lower aliphatic $C_1$-$C_4$ alcohols (e.g., methanol, ethanol, isopropanol, t-butanol). In preferred embodiments, the compositions contain less than about 0.1% by weight, based on the total weight of said lignin of organic solvent. In more preferred embodiments, the compositions contain substantially no organic solvent.

The compositions of the invention are preferably prepared from biomass by processes employing supercritical, subcritical, and/or near critical water, preferably without the addition of acid. The processes may include pretreatment step or steps using supercritical or near critical water to separate the C5 sugars (monomers and/or oligomers) from cellulose and lignin. In the pretreatment step, suitable temperatures are about 130° C. to about 250° C., suitable pressures are about 4 bars to about 100 bars, and suitable residence times are about 0.5 minutes to about 5 hours. The processes may also include a cellulose hydrolysis step or steps using supercritical or near critical water to separate the cellulose (which may processed to form C6 monomeric and/or oligomeric sugars) from the lignin. In the hydrolysis step(s), suitable temperatures are about 250° C. to about 450° C., suitable pressures are about 40 bars to about 260 bars, and suitable residence times are about 0.1 seconds to about 3 minutes.

The compositions of the invention may be prepared in any suitable reactor, including, but not limited to, a tubular reactor, a digester (vertical, horizontal, or inclined), or the like. Suitable digesters include the digester system described in U.S. Pat. No. 8,057,639, which include a digester and a steam explosion unit, the entire disclosure of which is incorporated by reference.

The compositions of the invention comprising lignin may be utilized in a variety of applications, including, but not limited to, fuels, tackifiers, phenol formaldehyde resin extenders in the manufacture of particle board and plywood, in the manufacture of molding compounds, urethane and epoxy resins, antioxidants, controlled-release agents, flow control agents, cement/concrete mixing, plasterboard production, oil drilling, general dispersion, tanning leather, road covering, vanillin production, dimethyl sulfide and dimethyl sulfoxide production, phenol substitute in phenolic resins incorporation into polyolefin blends, aromatic (phenol) monomers, additional miscellaneous monomers, carbon fibers, metal sequestration in solutions, basis of gel formation, polyurethane copolymer—as a renewable filler/extender, and the like.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1

Preparation of Lignin Compositions

Lignin compositions of the invention were prepared using supercritical, subcritical, and near critical water extraction in a two stage process. Particulate lignocellulosic biomass consisting of mixed hardwood chips of 140 mesh or less was mixed with water to form a slurry (about 20% by weight solids). The slurry was heated to a temperature of about 170-245° C. and then feed into a pretreatment reactor for about 1-120 minutes under sufficient pressure to keep the water in the liquid phase. The pretreated slurry was then cooled to a temperature less than about 100° C. under little (less than about 10 bar) or no pressure. The pretreated solids were then separated from the liquid stream using a filter press. Alternatively, the solids may be separated using a centrifugal filter pressor. The pretreated solids were then mixed with water to form a slurry and the slurry was heated to a temperature of about 150-250° C. The slurry was then subjected to supercritical water at about 374-600° C. in a hydrolysis reactor for about 0.05-10 seconds under a pressure of about 230-300 bar. After exiting the hydrolysis reactor, the hydrolyzed slurry was quenched with water and then flashed to about ambient temperature and pressure to remove water. The lignin solids were then separated from the liquid stream using a centrifugal decanter and air dried.

Example 2

Analysis of Lignin Compositions Using Inductively Coupled Plasma

The dried compositions containing the lignin of Example 1 were analyzed using inductively coupled plasma emission spectroscopy. The results are shown in the table below:

| ICP element | | Sample A Reported Conc. (mg/kg) | | Duplicate Reported Conc. (mg/kg) | | Sample B Reported Conc. (mg/kg) | | Duplicate Reported Conc. (mg/kg) | | Sample C Reported Conc. (mg/kg) | | Duplicate Reported Conc. (mg/kg) | Average |
|---|---|---|---|---|---|---|---|---|---|---|---|---|---|
| Al | | 45.5 | | 47.8 | | 39.1 | | 37.5 | | 43.6 | | 40.4 | 42.3 |
| As | < | 12.6 | < | 14.6 | < | 12.1 | < | 12.5 | < | 13.6 | < | 15.6 | 13.5 |
| B | | 3.22 | | 0.777 | | 2.88 | | 1.66 | | 0.603 | < | 0.605 | 1.6 |
| Ba | | 3.34 | | 3.62 | | 2.99 | | 2.99 | | 3.02 | | 2.77 | 3.1 |
| Be | < | 0.0300 | < | 0.0349 | < | 0.0288 | < | 0.0299 | < | 0.0326 | < | 0.0374 | 0.0 |
| Ca | | 618 | | 671 | | 551 | | 535 | | 594 | | 545 | 585.7 |
| Cd | < | 0.667 | < | 0.777 | < | 0.640 | < | 0.665 | < | 0.724 | < | 0.830 | 0.7 |
| Co | < | 0.972 | < | 1.13 | < | 0.933 | < | 0.969 | < | 1.05 | < | 1.21 | 1.0 |
| Cr | | 1.56 | | 1.94 | | 1.60 | | 1.66 | | 1.33 | | 1.38 | 1.6 |
| Cu | | 5.89 | | 8.80 | | 7.26 | | 7.87 | | 6.64 | | 19.0 | 9.2 |
| Fe | | 465 | | 501 | | 313 | | 298 | | 351 | | 320 | 374.6 |
| K | | 39.1 | | 40.4 | | 23.7 | | 31.1 | | 33.1 | | 44.1 | 35.3 |
| Li | < | 0.245 | < | 0.285 | < | 0.235 | < | 0.244 | < | 0.266 | < | 0.304 | 0.3 |
| Mg | | 21.9 | | 22.1 | | 18.8 | | 19.0 | | 18.6 | | 19.8 | 20.0 |
| Mn | | 5.89 | | 6.47 | | 5.02 | | 4.99 | | 4.34 | | 4.01 | 5.1 |

-continued

| ICP element | Sample A Reported Conc. (mg/kg) | | Duplicate Reported Conc. (mg/kg) | | Sample B Reported Conc. (mg/kg) | | Duplicate Reported Conc. (mg/kg) | | Sample C Reported Conc. (mg/kg) | | Duplicate Reported Conc. (mg/kg) | | Average |
|---|---|---|---|---|---|---|---|---|---|---|---|---|---|
| Mo | < | 2.34 | < | 2.72 | < | 2.25 | < | 2.33 | < | 2.54 | < | 2.91 | 2.5 |
| Na | | 58.7 | | 52.0 | | 54.6 | | 40.7 | | 50.6 | | 61.0 | 52.9 |
| Ni | < | 1.16 | < | 1.35 | < | 1.12 | < | 1.16 | < | 1.26 | < | 1.45 | 1.3 |
| P | < | 89.9 | < | 105 | < | 86.2 | < | 89.6 | < | 97.5 | < | 112 | 96.6 |
| Pb | < | 7.95 | < | 9.25 | < | 7.63 | < | 7.92 | < | 8.63 | < | 9.89 | 8.5 |
| S | | 105 | | 132 | | 146 | | 128 | | 128 | | 103 | 123.6 |
| Sb | < | 7.46 | < | 8.68 | < | 7.16 | < | 7.43 | < | 8.09 | < | 9.28 | 8.0 |
| Se | < | 16.5 | < | 19.2 | < | 15.9 | < | 16.5 | < | 18.0 | < | 20.6 | 17.8 |
| Si | | 54.9 | | 63.9 | | 42.1 | | 57.2 | | 67.6 | | 64.5 | 58.4 |
| Sn | | 9.23 | | 9.19 | | 7.04 | | 7.65 | | 10.9 | | 10.1 | 9.0 |
| Sr | | 2.11 | | 2.20 | | 1.81 | | 1.77 | | 1.93 | | 1.80 | 1.9 |
| Ti | | 3.56 | | 5.57 | | 2.77 | | 5.87 | | 3.26 | | 3.46 | 4.1 |
| Tl | < | 16.7 | < | 19.5 | < | 16.1 | < | 16.7 | < | 18.2 | < | 20.8 | 18.0 |
| V | < | 0.260 | < | 0.303 | < | 0.250 | < | 0.332 | < | 0.282 | < | 0.324 | 0.3 |
| Zn | | 9.79 | | 11.0 | | 9.28 | | 9.86 | | 7.48 | | 6.37 | 9.0 |
| Total Elements | | 1610.3 | | 1762.1 | | 1378.7 | | 1347.2 | | 1496.6 | | 1441.4 | 1506.0 |

Example 3

Analysis of Lignin for Carbon, Hydrogen, and Nitrogen

Dried compositions containing lignin were analyzed to determine the levels of ash, carbon, hydrogen, and nitrogen by thermal conductivity detection after combustion and reduction. The results are shown in the table below:

| Element/Material | Sample 1 | Sample 2 |
|---|---|---|
| C | 56.76% | 57.09% |
| H | 5.46% | 5.66% |
| N | 0.18% | 0.19% |
| Ash | 1.1% | 1.1% |
| Ratio of N + H:C | 0.099 | 0.102 |

Example 4

Lignin Characterization

The NREL method for lignin (acid hydrolysis followed by gravimetric protocol in accordance with standard NREL procedures found at http://www.nrel.gov/biomass/pdfs/42618.pdf and pyrolysis molecular beam mass spectrometry (py-MBMS) were used to quantify the level of lignin in the solids, using lignin from hardwood as a standard. The results are shown in the table below:

| Sample | Lignin Weight % from NREL Method | Lignin Weight % from py-MBMS Method | Syringyl/Guaiacyl Weight Ratio from py-MBMS Method |
|---|---|---|---|
| Hardwood standard | 28 | 23.3 | 2.6 |
| Pretreated solids | 40-44 | 21.6 | 2.4 |
| Solid residue after super-critical hydrolysis | >50 | 33.3 | 2.5 |

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A phenolic resin:
   wherein at least a portion of said phenolic resin is produced by a reaction with a phenol substitute;
   wherein said phenol substitute comprises:
     lignin; and
     less than about 2000 mg in total per kg of said lignin of elements;
   wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

2. The phenolic resin of claim 1,
   wherein said lignin has an average particle size less than about 500 microns.

3. The phenolic resin of claim 1,
   wherein said lignin has a bulk density of less than about 0.35 g/cc.

4. The phenolic resin of claim 1,
   wherein said phenol substitute is substantially free of organic solvent.

5. The phenolic resin of claim 1,
   wherein said phenol substitute comprises less than about 700 mg of calcium per kg of said lignin.

6. The phenolic resin of claim 1,
   wherein said phenol substitute comprises less than about 525 mg of iron per kg of said lignin.

7. The phenolic resin of claim 1,
   wherein said phenol substitute comprises less than about 150 mg of sulfur per kg of said lignin.

8. The phenolic resin of claim 1,
wherein said phenol substitute comprises less than about 20 g of ash per kg of said lignin.

9. The phenolic resin of claim 1,
wherein said phenol substitute comprises less than about 2000 mg of nitrogen per kg of said lignin.

10. The phenolic resin of claim 1,
wherein said phenol substitute has a weight ratio of the total mass of hydrogen and nitrogen to carbon of less than about 0.110.

11. The phenolic resin of claim 1,
wherein said lignin is present in said phenol substitute at a level of at least 30% by weight, based on the total weight of said phenol substitute, as measured by pyrolysis molecular beam mass spectrometry.

12. The phenolic resin of claim 1,
wherein said lignin is present in said phenol substitute in an amount greater than about 50 wt. %, based on the weight of said phenol substitute, as measured by NREL procedures.

13. The phenolic resin of claim 1,
wherein a weight ratio of syringyl monolignol to guaiacyl monolignol is about 2.0 to about 3.0, as measured by pyrolysis molecular beam mass spectrometry.

14. The phenolic resin of claim 1,
wherein said phenol substitute is a solid residue remaining after extracting lignocellulosic biomass using a two stage process, said two stage process comprising:
a first stage, wherein the lignocellulosic biomass is treated at a temperature of about 130° C. to about 250° C. for about 0.5 min to about 5 hours; and
a second stage, wherein solids obtained from said first stage are treated at a temperature of about 250° C. to about 450° C. for about 0.1 sec to about 3 min.

15. A phenol formaldehyde resin comprising:
a reaction product of phenol and formaldehyde; and
an extender, wherein said extender comprises:
 lignin; and
 less than about 2000 mg in total per kg of said lignin of elements;
 wherein said elements are Al, As, B, Ba, Be, Ca, Cd, Co, Cr, Cu, Fe, K, Li, Mg, Mn, Mo, Na, Ni, P, Pb, S, Sb, Se, Si, Sn, Sr, Ti, Tl, V, and Zn.

16. The phenol formaldehyde resin of claim 15,
wherein said lignin has an average particle size less than about 500 microns.

17. The phenol formaldehyde resin of claim 15,
wherein said lignin has a bulk density of less than about 0.35 g/cc.

18. The phenol formaldehyde resin of claim 15,
wherein said extender is substantially free of organic solvent.

19. The phenol formaldehyde resin of claim 15,
wherein said extender comprises less than about 700 mg of calcium per kg of said lignin.

20. The phenol formaldehyde resin of claim 15,
wherein said extender comprises less than about 525 mg of iron per kg of said lignin.

21. The phenol formaldehyde resin of claim 15,
wherein said extender comprises less than about 150 mg of sulfur per kg of said lignin.

22. The phenol formaldehyde resin of claim 15,
wherein said extender comprises less than about 20 g of ash per kg of said lignin.

23. The phenol formaldehyde resin of claim 15,
wherein said extender comprises less than about 2000 mg of nitrogen per kg of said lignin.

24. The phenol formaldehyde resin of claim 15,
wherein said extender has a weight ratio of the total mass of hydrogen and nitrogen to carbon of less than about 0.110.

25. The phenol formaldehyde resin of claim 15,
wherein said lignin is present in said extender at a level of at least 30% by weight, based on the total weight of said extender, as measured by pyrolysis molecular beam mass spectrometry.

26. The phenol formaldehyde resin of claim 15,
wherein said lignin is present in said extender in an amount greater than about 50 wt. %, based on the weight of said extender, as measured by NREL procedures.

27. The phenol formaldehyde resin of claim 15,
wherein a weight ratio of syringyl monolignol to guaiacyl monolignol is about 2.0 to about 3.0, as measured by pyrolysis molecular beam mass spectrometry.

28. The phenol formaldehyde resin of claim 15,
wherein said extender is a solid residue remaining after extracting lignocellulosic biomass using a two stage process, said two stage process comprising:
a first stage, wherein the lignocellulosic biomass is treated at a temperature of about 130° C. to about 250° C. for about 0.5 min to about 5 hours; and
a second stage, wherein solids obtained from said first stage are treated at a temperature of about 250° C. to about 450° C. for about 0.1 sec to about 3 min.

29. A particle board comprising the phenol formaldehyde resin of claim 15.

30. Plywood comprising the phenol formaldehyde resin of claim 15.

* * * * *